US006759790B1

(12) United States Patent
Bugel et al.

(10) Patent No.: US 6,759,790 B1
(45) Date of Patent: Jul. 6, 2004

(54) APPARATUS FOR MOVING FOLDED-BACK ARMS HAVING A PAIR OF OPPOSING SURFACES IN RESPONSE TO AN ELECTRICAL ACTIVATION

(75) Inventors: John Anthony Bugel, Largo, FL (US); Jeff Moler, Sarasota, FL (US)

(73) Assignee: Viking Technologies, L.C., Sarasota, FL (US)

( * ) Notice: Subject to any disclaimer, the term of this patent is extended or adjusted under 35 U.S.C. 154(b) by 0 days.

(21) Appl. No.: 10/107,951

(22) Filed: Mar. 27, 2002

Related U.S. Application Data (63) Continuation-in-part of application No. 10/067,762, filed on Feb. 6, 2002, and a continuation-in-part of application No. 09/771,533, filed on Jan. 29, 2001.

(51) Int. Cl.$^7$ ............................................. H01L 41/08
(52) U.S. Cl. ...................................................... 310/328
(58) Field of Search ............................ 310/323.02, 328

(56) References Cited

U.S. PATENT DOCUMENTS

| | | | |
|---|---|---|---|
| 3,144,802 A | 8/1964 | Faber, Jr. ..................... 84/454 |
| 3,405,289 A | 10/1968 | Gikow ......................... 310/328 |
| 3,414,779 A | 12/1968 | Bohm ........................... 257/416 |
| 3,421,109 A | 1/1969 | Wiggins et al. ........... 331/116 R |
| 3,446,920 A | 5/1969 | Zuerkr ......................... 369/134 |
| 3,513,309 A | 5/1970 | Hehemann .................. 250/493.1 |
| 3,548,314 A | 12/1970 | Mitchell ......................... 331/65 |
| 3,558,936 A | 1/1971 | Horan ..................... 310/323.01 |
| 3,614,486 A | 10/1971 | Smiley ......................... 310/8.2 |
| 3,649,857 A | 3/1972 | Knappe .................. 310/323.17 |
| 3,666,975 A | 5/1972 | Balamuth .................... 310/8.2 |
| 3,731,214 A | 5/1973 | Bers ............................ 330/5.5 |
| 3,749,946 A | 7/1973 | Von Ruti ..................... 310/319 |
| 3,902,084 A | 8/1975 | May, Jr. ....................... 310/8.1 |
| 3,902,085 A | 8/1975 | Bizzigotti .................... 310/8.3 |
| 4,009,447 A | 2/1977 | Wolf et al. .................. 330/110 |
| 4,018,124 A | 4/1977 | Rosado ........................ 84/723 |
| 4,044,239 A | 8/1977 | Shimauchi et al. ......... 700/280 |
| 4,088,916 A | 5/1978 | Weineck et al. ............. 84/454 |
| 4,112,879 A | 9/1978 | Assenheimer et al. .. 123/32 EA |
| 4,157,802 A | 6/1979 | May, Jr. ...................... 248/346 |
| 4,193,703 A | 3/1980 | Kakmann .............. 400/124.16 |
| 4,196,652 A | 4/1980 | Raskin ......................... 84/458 |

(List continued on next page.)

FOREIGN PATENT DOCUMENTS

| | | | |
|---|---|---|---|
| DE | 4220177 | 7/1994 | ........... F16K/11/02 |
| DE | 19523229 A1 | 1/1997 | ............ B25J/15/08 |

(List continued on next page.)

OTHER PUBLICATIONS

US 5,877,442, 3/1999, Freeland et al. (withdrawn)
Salim R et al: "Kleinste Objekte Im Griff A Grip on Even The Smallest Objects" F&M Feinwerktechnic Mikrotechnic Mikroelektronik, Carl Hanswer GmbH & Co, De, vol. 104, No. 9, Sep. 1, 1996, pp. 637–640, XP000636588.

(List continued on next page.)

*Primary Examiner*—Thomas M. Dougherty
(74) *Attorney, Agent, or Firm*—Young & Basile, P.C.

(57) ABSTRACT

A pizoelectric actuator assembly for actuating industrial control valves or clamps provides a compact actuator including a single piece main structure with integrated hinge, mechanical lever, and spring in a shape such that in response to electrical activation, the piezoelectric device transfers mechanical energy from a predetermined axis into the force transfer member operably positioned for driving at least one pivotable arm portion in rotational movement with a loss of motion of less than 40%.

25 Claims, 2 Drawing Sheets

U.S. PATENT DOCUMENTS

| | | | |
|---|---|---|---|
| 4,207,791 A | 6/1980 | Murakami | 84/672 |
| 4,208,636 A | 6/1980 | German | 331/94.5 P |
| 4,214,215 A | 7/1980 | Mellen et al. | 372/70 |
| 4,228,680 A | 10/1980 | Engel et al. | 73/119 A |
| 4,287,582 A | 9/1981 | Tocquet | 367/163 |
| 4,313,361 A | 2/1982 | Deutsch | 84/101 |
| 4,318,023 A | 3/1982 | O'Neill et al. | 310/328 |
| 4,319,843 A | 3/1982 | Gornall | 356/346 |
| 4,327,623 A | 5/1982 | Mochida et al. | 84/454 |
| 4,336,809 A | 6/1982 | Clark | 128/665 |
| 4,388,908 A | 6/1983 | Babitzka et al. | 123/500 |
| 4,426,907 A | 1/1984 | Scholz | 84/454 |
| 4,426,981 A | 1/1984 | Greiner et al. | 123/488 |
| 4,430,899 A | 2/1984 | Wessel | 73/754 |
| 4,432,228 A | 2/1984 | Kuschmierz et al. | 73/119 |
| 4,434,753 A | 3/1984 | Mukainakano et al. | 123/143 |
| 4,435,666 A | 3/1984 | Fukui et al. | 310/328 |
| 4,460,840 A | 7/1984 | Weiger et al. | 310/328 |
| 4,463,727 A | 8/1984 | Babitzka et al. | 123/458 |
| 4,468,583 A | 8/1984 | Mori | 310/328 |
| 4,479,475 A | 10/1984 | Babitzka | 123/446 |
| 4,570,095 A * | 2/1986 | Uchikawa | 310/328 |
| 4,570,096 A | 2/1986 | Hara et al. | 310/328 |
| 4,580,540 A | 4/1986 | Babitzka et al. | 123/458 |
| 4,584,923 A | 4/1986 | Minnick | 84/454 |
| 4,612,440 A | 9/1986 | Brunnee et al. | 250/281 |
| 4,617,952 A | 10/1986 | Fujiwara et al. | 137/85 |
| 4,629,039 A | 12/1986 | Imoto et al. | 188/72.1 |
| 4,629,926 A | 12/1986 | Siegal | 310/331 |
| 4,633,118 A | 12/1986 | Kosugi | 310/328 |
| 4,647,808 A | 3/1987 | Shibuya | 442/228 |
| 4,660,523 A | 4/1987 | Brauer et al. | 123/458 |
| 4,667,639 A | 5/1987 | Linder et al. | 123/450 |
| 4,675,568 A | 6/1987 | Uchikawa et al. | 310/328 |
| 4,697,118 A | 9/1987 | Harnden, Jr. et al. | 310/331 |
| 4,703,215 A * | 10/1987 | Asano | 310/328 |
| 4,714,855 A | 12/1987 | Fujimoto | 310/328 |
| 4,725,002 A | 2/1988 | Trachte | 239/102.2 |
| 4,732,071 A | 3/1988 | Deutsch | 84/454 |
| 4,735,185 A | 4/1988 | Imoto et al. | 123/498 |
| 4,736,131 A | 4/1988 | Fujimoto | 310/328 |
| 4,749,897 A | 6/1988 | Natsume et al. | 310/317 |
| 4,750,706 A | 6/1988 | Schlagmüller | 251/129.06 |
| 4,757,223 A | 7/1988 | Ueyama | 310/82 |
| 4,769,569 A | 9/1988 | Stahlhuth | 310/328 |
| 4,777,398 A | 10/1988 | Shibuya | 310/328 |
| 4,783,610 A * | 11/1988 | Asano | 310/328 |
| 4,793,313 A | 12/1988 | Paganon et al. | 123/506 |
| 4,803,908 A | 2/1989 | Skinn et al. | 84/454 |
| 4,808,874 A | 2/1989 | Stahlhuth | 310/328 |
| 4,816,713 A | 3/1989 | Change, Jr. | 310/319 |
| 4,821,726 A | 4/1989 | Tamura et al. | 123/498 |
| 4,835,747 A | 5/1989 | Billet | 367/164 |
| 4,838,233 A | 6/1989 | Hayashi et al. | 123/506 |
| 4,847,193 A | 7/1989 | Richards et al. | 435/6 |
| 4,857,791 A | 8/1989 | Uchino et al. | 310/321 |
| 4,874,978 A | 10/1989 | Sakaida et al. | 310/328 |
| 4,874,979 A | 10/1989 | Rapp | 310/328 |
| 4,874,980 A | 10/1989 | Mine et al. | 310/328 |
| 4,893,750 A | 1/1990 | Haworth et al. | 239/71 |
| 4,909,126 A | 3/1990 | Skinn et al. | 84/454 |
| 4,929,859 A | 5/1990 | Suzuki et al. | 310/328 |
| 4,933,591 A | 6/1990 | Stahlhuth | 310/328 |
| 4,937,489 A | 6/1990 | Hattori et al. | 310/316 |
| 4,940,037 A | 7/1990 | Eckert | 123/506 |
| 4,947,077 A | 8/1990 | Murata | 30/328 |
| 4,979,275 A | 12/1990 | Sakaida et al. | 29/25.37 |
| 4,999,284 A | 3/1991 | Ward et al. | 435/4 |
| 5,004,946 A | 4/1991 | Sakaida et al. | 310/328 |
| 5,009,142 A | 4/1991 | Kurtz | 84/454 |
| 5,027,027 A | 6/1991 | Orbach et al. | 310/317 |
| 5,028,834 A | 7/1991 | Sakaida et al. | 310/328 |
| 5,034,647 A | 7/1991 | Ohtsuka | 310/328 |
| 5,038,657 A | 8/1991 | Busley | 84/455 |
| 5,040,514 A | 8/1991 | Kubach | 123/490 |
| 5,063,542 A | 11/1991 | Petermann et al. | 367/166 |
| 5,065,660 A | 11/1991 | de Buda | 84/200 |
| 5,072,288 A | 12/1991 | MacDonald et al. | 257/420 |
| 5,078,241 A | 1/1992 | Ackermann et al. | 188/282.6 |
| 5,080,079 A | 1/1992 | Yoshida et al. | 123/531 |
| 5,094,429 A | 3/1992 | Dostert | 251/129.06 |
| 5,109,885 A | 5/1992 | Tauscher | 137/554 |
| 5,115,880 A | 5/1992 | Sallas et al. | 181/106 |
| 5,157,256 A | 10/1992 | Aaron | 250/306 |
| 5,161,774 A | 11/1992 | Engelsdorf et al. | 251/11 |
| 5,182,484 A | 1/1993 | Culp | 310/328 |
| 5,191,252 A | 3/1993 | Sano | 310/328 |
| 5,199,641 A | 4/1993 | Hohm et al. | 239/102.2 |
| 5,205,147 A | 4/1993 | Wada et al. | 72/429 |
| 5,237,238 A | 8/1993 | Berghaus et al. | 310/328 |
| 5,239,904 A | 8/1993 | Yamaguchi et al. | 83/218 |
| 5,270,984 A | 12/1993 | Mine | 367/140 |
| 5,314,175 A | 5/1994 | Izumi et al. | 269/224 |
| 5,319,257 A | 6/1994 | McIntyre | 310/328 |
| 5,323,680 A | 6/1994 | Miller et al. | 84/455 |
| 5,323,948 A | 6/1994 | Yamazaki et al. | 228/4.5 |
| 5,328,149 A | 7/1994 | Reuter | 251/129.06 |
| 5,332,942 A | 7/1994 | Rennex | 310/328 |
| 5,335,862 A | 8/1994 | Esper | 239/570 |
| 5,343,793 A | 9/1994 | Pattie | 84/454 |
| RE34,823 E | 1/1995 | Sakaida et al. | 310/328 |
| 5,388,751 A | 2/1995 | Harada et al. | 228/4.5 |
| 5,390,579 A | 2/1995 | Burgon | 84/454 |
| 5,410,206 A | 4/1995 | Luecke et al. | 310/328 |
| 5,410,207 A | 4/1995 | Miura et al. | 310/328 |
| 5,413,076 A | 5/1995 | Koenigswieser et al. | 123/446 |
| 5,425,343 A | 6/1995 | Akaki et al. | 123/490 |
| 5,435,477 A | 7/1995 | Torihata et al. | 228/4.5 |
| 5,444,324 A | 8/1995 | Priest et al. | 310/324 |
| 5,460,202 A | 10/1995 | Hanley et al. | 137/627 |
| 5,465,021 A | 11/1995 | Visscher et al. | 310/328 |
| 5,477,831 A | 12/1995 | Akaki et al. | 123/490 |
| 5,479,084 A | 12/1995 | Satsuma | 310/328 |
| 5,482,213 A | 1/1996 | Matsusaka et al. | 239/584 |
| 5,500,777 A | 3/1996 | Hasegawa et al. | 360/77.16 |
| 5,501,986 A | 3/1996 | Ward et al. | 436/525 |
| 5,518,184 A | 5/1996 | Potz et al. | 239/533.4 |
| 5,645,226 A | 7/1997 | Bright | 239/585.1 |
| 5,685,485 A | 11/1997 | Mock et al. | 239/102.2 |
| 5,697,554 A | 12/1997 | Auwaerter et al. | 239/88 |
| 5,712,524 A | 1/1998 | Suga | 310/328 |
| 5,746,422 A | 5/1998 | Harada et al. | 269/172 |
| 5,751,090 A | 5/1998 | Henderson | 310/328 |
| 5,779,149 A | 7/1998 | Hayes, Jr. | 239/124 |
| 5,780,759 A | 7/1998 | Szalay | 84/454 |
| 5,780,956 A | 7/1998 | Oliver et al. | 310/323 |
| 5,780,957 A | 7/1998 | Oliver et al. | 310/328 |
| 5,803,370 A | 9/1998 | Heinz et al. | 239/533 |
| 5,810,255 A | 9/1998 | Itoh et al. | 239/102.2 |
| 5,824,929 A | 10/1998 | Freeland et al. | 84/454 |
| 5,824,937 A | 10/1998 | Szalay | 84/654 |
| 5,831,264 A | 11/1998 | Shedd et al. | 250/306 |
| 5,847,387 A | 12/1998 | Shedd et al. | 250/306 |
| 5,859,378 A | 1/1999 | Freeland et al. | 84/454 |
| 5,859,561 A | 1/1999 | Vanoli | 327/516 |
| 5,875,764 A | 3/1999 | Kappel et al. | 123/467 |
| 5,881,767 A | 3/1999 | Löser | 137/599 |
| 5,883,323 A | 3/1999 | Kaufman | 84/454 |
| 5,886,270 A | 3/1999 | Wynn | 84/313 |
| 5,901,896 A | 5/1999 | Gal | 228/4.5 |
| 5,907,211 A | 5/1999 | Hall et al. | 310/328 |

| | | | | | | |
|---|---|---|---|---|---|---|
| 5,907,212 A | 5/1999 | Okada ............... 310/328 | EP | 0 704 916 A1 | 9/1995 | |
| 5,907,269 A | 5/1999 | Zrostlik ............. 335/215 | JP | 61-150287 | 7/1986 | |
| 5,934,976 A | 8/1999 | Makino et al. ........ 451/28 | JP | 62-23381 | 1/1987 | |
| 5,946,969 A | 9/1999 | Munekata et al. ...... 74/110 | JP | 62-217880 | 9/1987 | |
| 5,975,428 A | 11/1999 | Potschin et al. ....... 239/88 | JP | 62217880 | 9/1987 | ............ H02N/2/00 |
| 5,977,467 A | 11/1999 | Freeland et al. ....... 84/454 | JP | 1-152976 | 6/1989 | |
| 6,003,836 A | 12/1999 | Cewers .......... 251/129.06 | JP | 2-260476 | 10/1990 | |
| 6,016,040 A | 1/2000 | Hoffmann et al. ..... 318/116 | JP | 3234981 | 10/1991 | ............ F16K/31/02 |
| 6,021,760 A | 2/2000 | Boecking ........... 123/467 | JP | 4-165966 | 11/1992 | |
| 6,025,671 A | 2/2000 | Boecking ........... 310/369 | JP | 5-305574 | 11/1993 | |
| 6,035,722 A | 3/2000 | Giersch et al. ........ 73/714 | JP | 6-105568 | 4/1994 | |
| 6,040,643 A | 3/2000 | Bruns ............... 310/26 | JP | 6105568 | 4/1994 | ............ H02N/2/00 |
| 6,060,814 A | 5/2000 | Hoffmann et al. .... 310/316.03 | JP | 7-236287 | 5/1995 | |
| 6,062,533 A | 5/2000 | Kappel et al. ......... 251/57 | JP | 8093944 | 4/1996 | ............ F16K/31/02 |
| 6,104,125 A | 8/2000 | Pan et al. ........... 310/328 | WO | WO 98/23868 | 6/1998 | |
| 6,131,879 A | 10/2000 | Kluge et al. ....... 251/129.06 | WO | WO0179731 A | 10/2001 | ............ F16K/31/02 |
| 6,166,307 A | 12/2000 | Caulkins et al. ........ 84/50 | WO | 2001/0030306 A1 | 10/2001 | ............ 251/129.9 |
| 6,246,157 B1 | 6/2001 | Oliver et al. ........ 310/328 | | | | |
| 6,246,287 B1 | 6/2001 | Yamashita ........... 330/174 | | | | |
| 6,291,928 B1 | 9/2001 | Lazarus et al. ....... 310/328 | | | | |
| 6,294,859 B1 | 9/2001 | Jaenker ............. 310/328 | | | | |
| 6,411,009 B2 | 6/2002 | Jaenker ............ 310/316.01 | | | | |

FOREIGN PATENT DOCUMENTS

| | | | | |
|---|---|---|---|---|
| DE | 19946003 | 5/2000 | ............ F16K/7/00 |
| DE | 19946838 | 10/2000 | ............ F16K/31/02 |

OTHER PUBLICATIONS

Xu Wei, King Tim: "Flexure Hinges for Piezoactuator Dispalcement Amplifiers: Flexibility, Accuracy, and Stress Considerations" Precision Engingeering, vol. 19, No. 1, Jul. 1996, pp. 4–10, XP002256802.

* cited by examiner

APPARATUS FOR MOVING FOLDED-BACK ARMS HAVING A PAIR OF OPPOSING SURFACES IN RESPONSE TO AN ELECTRICAL ACTIVATION

CROSS-REFERENCE TO RELATED APPLICATION

This application is a Continuation-In-Part application of U.S. patent application Ser. No. 09/771,533 filed Jan. 29, 2001, published as Publication No. U.S. Pat. No. 2001/0030306 A1, on Oct. 18, 2001, and U.S. patent application Ser. No. 10/067,762, filed Feb. 6, 2002.

FIELD OF THE INVENTION

The present invention relates generally to an actuator assembly, and more specifically relates to moving folded-back arms having a pair of opposing surfaces in response to electrical activation.

BACKGROUND OF THE INVENTION

Actuators are required in a wide variety of modern applications. For example, valves and relays are used throughout industry, transportation, architecture, etc. Presently, electromagnetic solenoids are used in a wide variety of clamping and valving applications. However, electro-magnetic solenoids have many shortcomings. In general, solenoids are relatively large and heavy. Solenoids consume relatively high amounts of power to remain energized. When supplied with only a reduced amount of power, solenoids operate unpredictably. It is difficult to maintain a solenoid in a partially open or partially closed position. Solenoids have relatively slow cycle times, provide weak opening and closing forces, and generate EMF (electromotive force). Differential pressure is required to operate most solenoids. When designed as a valve, most solenoids are gravity sensitive and include a fixed inlet valve port and a fixed outlet valve port requiring a predetermined installation orientation. Recently, piezoelectric bimorphs have also been used in some valve applications. Piezoelectric bimorph valves have several advantages including low power consumption, small size, light weight, and fast cycle times. Piezoelectric bimorph valves can be operated in a partially open or partially closed valve position. However, such valves produce relatively weak valve sealing forces resulting in substantial potential for fluid leakage.

Various types of piezoelectric devices are known to those skilled in the art. Many of these devices include complex configurations and are very expensive to manufacture. Other devices include simpler configurations, but are extremely limited in the corresponding maximum range of movement or the corresponding maximum application of force.

In such known devices, when the piezoelectric actuator is electrically activated, the rectangular prism geometry of the device expands predominantly along a predetermined axis. When the piezoelectric device is deactivated, the geometry of the device contracts predominantly along the predetermined axis. This expansion open and close a clamp or valve. An apparatus for clamping or valving typically includes a support having two members spaced with respect to each other. The piezoelectric device is transversely disposed between the two spaced members. As the piezoelectric device expands in a linear direction, the members are driven or pivoted along a curvilinear path, The pivoting of the members along a curvilinear path results in an inefficient transfer of force from the piezoelectric device to the support. The piezoelectric actuator in most known configurations is positioned parallel to the desired motion providing little opportunity to select different hinge axis locations and/or structural configurations to optimize performance.

SUMMARY OF THE INVENTION

The present invention improves the prior art by providing additional options to structural configurations, and performance optimizations never possible before. The present invention provides an apparatus for moving at least one folded-back arm having a surface in response to an electrical activation. Preferably, a pair of folded-back arms having a pair of opposing surfaces are moved relative to one another in response to an electrical activation. The apparatus includes a support having a rigid non-flexing portion, first and second arm portions extending rearward from the rigid portion, a pair of opposing surfaces with one opposing surface on each pivotable arm portion for movement relative to one another, and a force transfer member operably positioned between the first and second pivotable arm portions. An actuator is operably engaged between the rigid non-flexing portion and the force transfer member to drive the force transfer member in movement along a fixed path causing at least one of the first and second pivotable arm portions to pivot in response to an electrical activation of the actuator. The support, pivotable arms, and force transfer of the structure are designed to be rigid, non-flexing portions of a monolithic structure interconnected by flexible hinge portions allowing the rigid portions to move relative to one another. Any unplanned flexing can reduce the effective life of the mechanism, and reduces the amount of force transferred through the hinge axis to the pivot arms. The reduction in force limits the displacement and force of the pivoting arms. The selection of the hinge axis location and corresponding structural configuration allows substantial capability to optimize the performance and size of the apparatus for the particular application.

The piezoelectric actuator can be preloaded with force when installed in the support element. For example, the piezoelectric actuator can be clamped within the support structure with an adjustable screw supporting one end allowing the optimal force preloading. An adjustable screw configuration is easy to use and allows a large degree of adjustability. Preloading the piezoelectric actuator in any suitable fashion contributes to the maximum efficiency of the force transfer during actuation, and allows fine-tuning of the initial position of the apparatus prior to actuation of the piezoelectric element. Preloading can also ensure that the piezoelectric actuator maintains contact with the apparatus at opposite ends throughout the range of expansion and contraction. The use of a threaded adjustment screw for preloading enables assembly without requiring adhesives or other means of securely connecting the piezoelectric actuator at opposite ends to the apparatus, and avoids the possibility of damaging tension or torsional moments on the piezoelectric actuator. The threaded adjustment screw allows simple compensation for dimensional variations in the piezoelectric actuator during assembly to the support.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
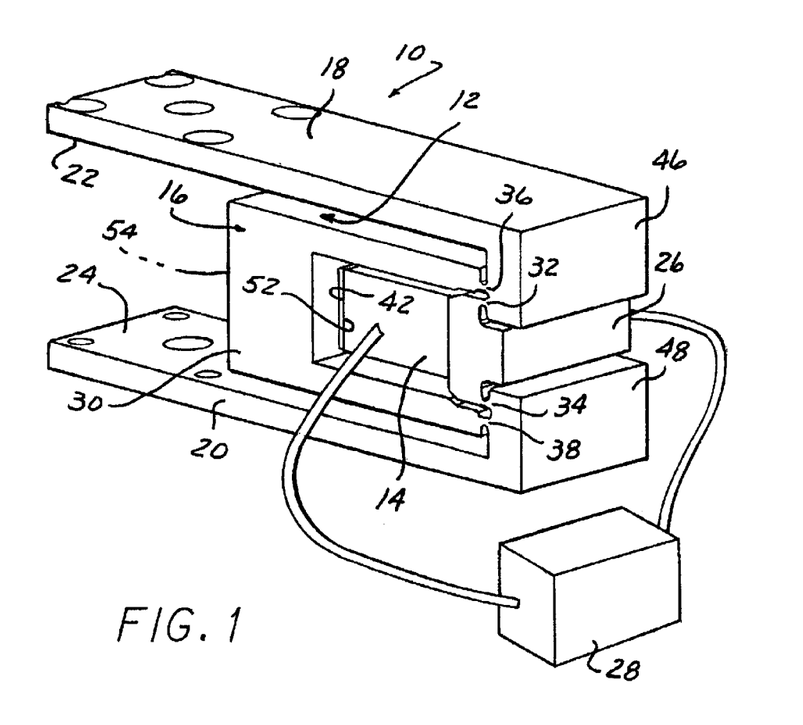
FIG. 1 is a perspective view of one embodiment of an apparatus for moving at least one folded-back arm having at least one surface of a pair of opposing surfaces moveable in response to an electrical activation, the apparatus having a support and actuator in accordance with the present invention.

FIG. 1 is a perspective view of one embodiment of an apparatus 10 having a support 12 and an actuator 14 in accordance with the present invention. The support 12 includes a rigid, non-flexible portion 16, at cast one pivotable arm portion, such as first and second pivotable arm portions 18, 20 extending rearward from the rigid portion 16, a pair of opposing surfaces 22, 24 with opposing surfaces 22, 24 on each pivotable arm portion 18, 20 for movement relative to one another, and a force transfer member 26 operably positioned between the first and second pivotable arm portions 18, 20. Preferably, the support 12 is a unitary, integral, single-piece monolithic body. The actuator 14 is operably engaged between the rigid, non-flexable portion 16 and the force transfer member 26 to drive the force transfer member 26 in learn motion away from the rigid, non-flexible portion 16. The rigid non-flexible potion 16 receives an adjustable support 54 with an adjustable seat 52 having a complementary surface to the end 42 of the actuator 14. The complementary surface of the adjustable seat 52 can be flat or shaped in any manner to support the actuator 14 in a position suitable for driving the force transfer member 26 in response to an electrical actuation of the actuator 14. Movement of the force transfer member 26 pivots at least one pivotable arm portion 18, 20 about at least one living hinge 36, 38 with a loss of motion of less than 40%. At least one living hinge 36, 38 extends between each rigid arm portion and a pivotal base portion 46, 48 of each corresponding pivotable arm portion, and at least one living hinge 32, 34 extends between the corresponding base portion 46, 48 of the pivotable arm portions and the force transfer member 26. A controller 28 can be provided to operate the apparatus 10. The controller can provide a charging voltage across the piezoelectric device to produce spatial displacement along a predetermined axis. The amount of electrical charge stored by the piezoelectric device is generally proportional to the amount of voltage applied across the piezoelectric device. Thus, varying the amount of voltage applied across the piezoelectric device can control the amount of spatial displacement along one predetermined axis. This spatial displacement is transferred and amplified via the living integral hinge 36, 38 into at least one pivotable arm 18, 20 causing the corresponding one of the opposing surfaces 22, 24 to move in a curvilinear path with respect to the other.

Figure 2:
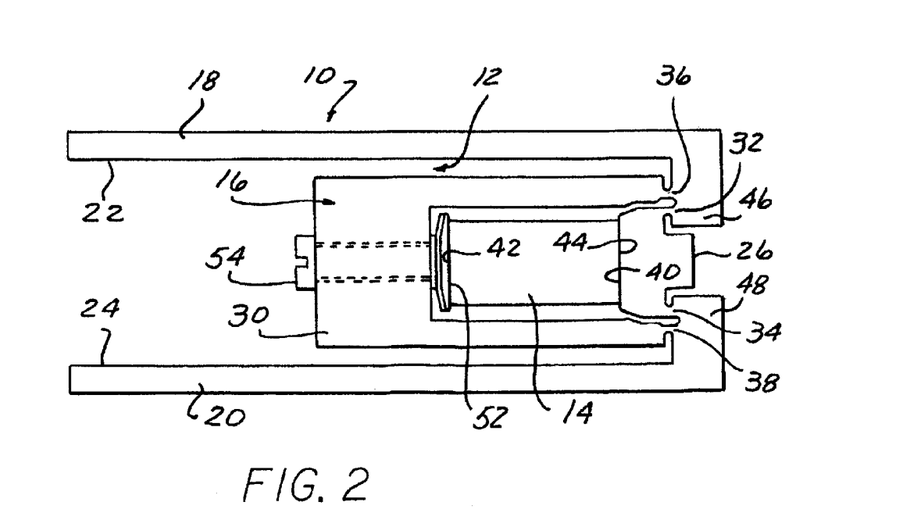
FIG. 2 is a side view of the apparatus of FIG. 1 with the actuator deactivated.
Figure 3:
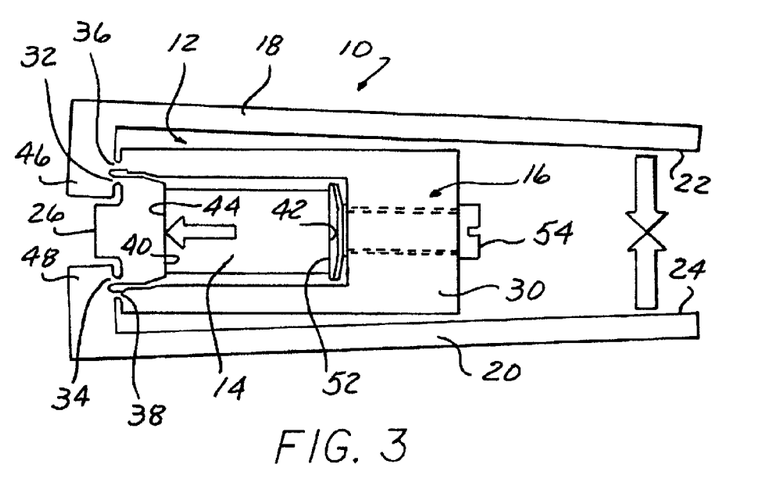
FIG. 3 is an exaggerated side view of the apparatus of FIG. 1 with the actuator fully activated.

In FIG. 2, the actuator 14 is deactivated. The opposing surfaces 22, 24 are furthest from each other when the actuator 14 is deactivated. This type of configuration is commonly referred to as a normally open design. When the actuator 14 is electrically activated, the set end 42 of actuator 14 is held fixed by the rigid portion 16, the driving end 44 of the actuator 14 drives the force transfer member 26 away or apart from the rigid web 30, and pivotable arms portions 18, 20 are pivoted about living hinges 36, 38. In this manner, the space or distance between the opposing surfaces 22, 24 is decreased. The distance between the opposing surfaces can be increased or decreased by adjusting the voltage across the piezoelectric device. FIG. 3, illustrates the planar driving end 44 of the actuator 14 in operable contact with the planar seat surface 40 of the force transfer member 26 when the actuator 14 is fully activated and is exaggerated to show a larger closing between the opposing surfaces 22, 24.

In the embodiment illustrated in FIGS. 1–3, these components have been machined from a single monolithic piece of metallic material for example stainless steel. Other suitable materials can include powdered metal, metallic alloys, composite materials, or a combination of metallic and composite materials. Although these materials given as examples provide excellent performance, depending on the requirements of a particular application, use of other materials for the support can be appropriate. Some components like the pivotable arm portions can be manufactured separate from the rigid non-flexing generally C-shaped or generally U-shaped structure and joined later to define the generally W-shaped or generally M-shaped combined structure as illustrated in FIG. 4.

Figure 4:
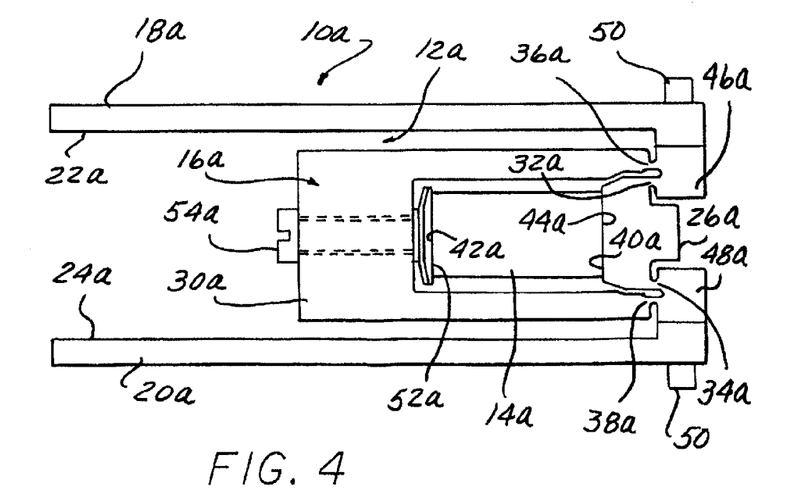
FIG. 4 is a side view of the apparatus illustrating mechanically fastened pivotable arm portions to the rigid portion of the support outwardly from the location of the living hinges.

In the embodiment illustrated in FIG. 4, the apparatus 10a is made with four discrete components. The first component includes the support 12a including a rigid web 30a connecting rigid arm portions to define a generally C-shaped or generally U-shaped portion of the apparatus 10a. At least one living hinge 36a, 38a extends between each rigid arm portion and a pivotal base portion 46a, 48a of each corresponding pivotable arm portion, and at least one living hinge 32a, 34a extends between the corresponding base portion 46a, 48a of the pivotable arm portions and the force transfer member 26a. The second and third components are the separable and pivotable arm portions 18a, 20a attached to the corresponding bases 46a, 48a of the support 12a using fasteners 50. The fourth component is the actuator 14a operably engaged between the rigid web 30a and the force transfer member 26a. An adjustable support 54a can be provided with an adjustable seat 52a having a complementary surface to an end 42a of the actuator 14a. The complementary surface of the adjustable seat 52a can be flat or shaped in any manner to support the actuator 14a in a position suitable for driving the force transfer member 26a in response to electrical actuation of the actuator 14a.

In the embodiments illustrated in FIGS. 1–4, a basic apparatus 10, 10a is illustrated and described. The present invention can be used in other applications besides the valves, clamps, and relays previously described. These applications can include a broad range of devices using oscillatory motion. By way of example and not limitation, some possible configurations of devices can include a sander, a toothbrush, a shaver, an engraving tool, optical systems, and motors. The efficiency of the apparatus is enhanced for oscillatory motions by operating the structure in mechanical resonance. At a mechanical non-resonant frequency and an input voltage of one, the mechanical output for the structure would be one. At a mechanical resonant frequency and an input voltage of one, the mechanical output for the structure can be as great as four hundred. This property can be used in several ways. The mechanical resonant property can be used to increase the mechanical output for the same electrical input, or the electrical input can be reduced to obtain the same mechanical output. It should be recognized that a balance between the desired input and output can be obtained depending on the particular application.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for moving at least one of a pair of opposing surfaces in response to an electrical activation comprising:

a support having a rigid non-flexing portion, at least one pivotable folded-back arm portion extending from the rigid portion a pair of opposing surfaces with one opposing surface on the at least pivotable folded-back arm portion for movement relative to one another, and a rigid, non-flexing force transfer member operably positioned for driving the at least one pivotable folded-back arm portion in rotational movement with a loss of motion of less than 40%; and an actuator operably engaged between the rigid non-flexing portion and the force transfer member to drive the force transfer member relative to the rigid portion to pivot the at least one pivotable folded-back arm portion in response to an electrical activation of the actuator.

2. The apparatus of claim 1 wherein the support is a single monolithic piece.

3. The apparatus of claim 1 wherein the actuator is a piezoelectric device.

4. The apparatus of claim 1 when the rigid portion is generally U-shaped and includes a web extending between a pair of rigid arm portions.

5. The apparatus of claim 4 wherein one of the pivotable folded-back arm portions is pivotably connected to one of the rigid arm portions and the other of the pivotable folded-back arm portions is pivotably connected to the other of the rigid arm portions.

6. The apparatus of claim 5 wherein the rigid portion of the support is interposed between the pivotable folded-back arm portions, such that the force transfer member is adjacent one end of the pivotable folded-back arm portions and the opposite surfaces of the pivotable folded-back arm portions are adjacent to the web of the support.

7. The apparatus of claim 6 wherein the rigid arm portions are formed as a singe monolithic piece with the web of the support.

8. The apparatus of claim 5 wherein the pivotable arm portions are mechanically fastened to the support.

9. The apparatus of claim 1 wherein the apparatus is operated in am mechanically resonant mode producing oscillatory motion.

10. An apparatus for moving at least one of a pair of opposing surfaces in response to an electrical activation comprising:

a support having a rigid non-flexing portion, first and second pivotable folded-back arm portions extending from the rigid portion such that the rigid portion is positioned interposed between the first and second pivotable folded-back arm portions, a pair of opposing surfaces with one opposing surface on each of the pivotable folded-back arm portions for movement relative to one another, and a rigid, non-flexing force transfer member operably positioned for driving the first and second pivotable folded-back arm portions in rotational movement with a loss of motion of less than 40%;

first and second flexible hinge web portions extending in close proximity to one another allowing flexing movement of the at least one rigid folded back arm with respect to the rigid portion and the force transfer member; and an actuator operably engaged between the rigid non-flexing portion and the force transfer member to drive the force transfer member relative to the rigid portion to pivot the first and second pivotable folded-back arm portions in response to an electrical activation of the actuator.

11. The apparatus of claim 10 wherein the support is a single monolithic piece.

12. The apparatus of claim 10 wherein the actuator is a piezoelectric device.

13. The apparatus of claim 10 wherein the rigid portion is generally U-shaped and includes a web extending between a pair of rigid arm portions.

14. The apparatus of claim 13 wherein one of the pivotable folded-back arm portions is pivotably connected to one of the rigid arm portions and the other of the pivotable folded-back am portions is pivotably connected to the other of the rigid arm portions.

15. The apparatus of claim 14 wherein the force transfer member is adjacent one end of the pivotable folded-back arm portions and the opposing surfaces of the pivotable folded-back arm portions are adjacent to the web of the rigid portion of the support.

16. The apparatus of claim 15 wherein the rigid arm portions are formed as a single monolithic piece with the web.

17. The apparatus of claim 14 wherein the pivotable arm portions are mechanically fastened to the support.

18. The apparatus of claim 10 wherein the apparatus is operated in an mechanically resonant mode producing oscillatory motion.

19. An apparatus for moving at least one of a pair of opposing surfaces in response to an electrical activation comprising:

a support having a rigid non-flexing portion of generally U-shaped configuration with a web extending between a pair of rigid arm portions, first and second pivotable folded-back arm portions of generally L-shaped configuration extending from the rigid arm portions such that the rigid non-flexing portion is positioned interposed between the first and second pivotable folded-back arm portions, a pair of opposing surfaces with one opposing surface on each of the pivotable folded-back arm portions for movement relative to one another, and a rigid, non-flexing force transfer member operably positioned for driving the first and second pivotable folded-back arm portions in rotational movement with a loss of motion of less than 40%, such that the force transfer member is adjacent one end of the pivotable folded-back arm portions and the opposing surfaces of the pivotable folded-back arm portions are adjacent to the web of the rigid non-flexing portion of the support;

first and second flexible hinge web portions extending in close proximity to one another, the first hinge web portion extending between the force transfer member and operably associated with the at least one rigid folded back arm, the second hinge web portion extending between the rigid portion and the at least one rigid folded back arm; and a piezoelectric actuator operably engaged between the rigid non-flexing portion and the force transfer member to drive the force transfer member relative to the rigid non-flexing portion to pivot the first and second pivotable folded-back arm portions in response to an electrical activation of the actuator.

20. The apparatus of claim 19 wherein the web and rigid arm portions of the support are a single monolithic piece.

21. The apparatus of claim 19 wherein the pivotable arm portions are mechanically fastened to the support.

22. The apparatus of claim 19 wherein the apparatus is operated in an medically resonant mode producing oscillatory motion.

23. The apparatus of claim 1, wherein the force transfer member extends outwardly to a position adjacent the at least one pivotable folded-back arm portion.

24. The apparatus of claim 10, wherein the force transfer member extends outwardly to a position at least partially interposed in a gap between the first and second pivotable folded-back arm portions.

25. The apparatus of claim 19, wherein the force transfer member extends outwardly to a position at least partially interposed in a gap between the first and second pivotable folded-back arm portions, portion and the force transfer member to drive the force transfer member relative to the rigid non-flexing portion to pivot the first and second pivotable folded-back arm portions in response to an electrical activation of the actuator.

* * * * *

UNITED STATES PATENT AND TRADEMARK OFFICE
CERTIFICATE OF CORRECTION

PATENT NO. : 6,759,790 B1 Page 1 of 1
APPLICATION NO. : 10/107951
DATED : August 2, 2004
INVENTOR(S) : John Anthony Bugel and Jeff Moler It is certified that error appears in the above-identified patent and that said Letters Patent is hereby corrected as shown below:

On the title page item (56), in References Cited under U.S. PATENT DOCUMENTS:
Reference 4,088.916: "84/454" should read --310/328--
Reference 4,979,275: "30/328" should read --310/328--
Reference 5,479,084: "5,479,084" should read --5,479,064--
Reference 5,479,084: "Satsuma" should read --Sano--
Add Reference to list: --4,088,052 A 5/1978 Hendick.....84/454--
Column 1, line 59: "expansion open" should read --expansion and contraction of the piezoelectric device can be used to operate an apparatus, e.g. to open--
Column 1, line 65: "path The" should read --path. The--
Column 3, line 21: "at east one" should read --at least one--
Column 3, line 32: "in learn motion" should read --in linear motion--
Column 5, line 19: "portion a pair" should read --portion, a pair--
Column 5, line 20: "least pivotable" should read --least one pivotable--
Column 5, line 56: "in am mechanically" should read --in an mechanically--
Column 6, line 28: "folded-back am portions" should read --folded-back arm portions--
Column 7, line 16: "an medically resonant" should read --an mechanically resonant--
Column 8, lines 11-15: Cancel beginning with ", portion and the force transfer"to and including "the actuator"

Signed and Sealed this

Fifteenth Day of January, 2008

JON W. DUDAS
*Director of the United States Patent and Trademark Office*

UNITED STATES PATENT AND TRADEMARK OFFICE
CERTIFICATE OF CORRECTION

PATENT NO. : 6,759,790 B1  Page 1 of 1
APPLICATION NO. : 10/107951
DATED : July 6, 2004
INVENTOR(S) : John Anthony Bugel and Jeff Moler It is certified that error appears in the above-identified patent and that said Letters Patent is hereby corrected as shown below:

On the title page item (56), in References Cited under U.S. PATENT DOCUMENTS:
Reference 4,088,916: "84/454" should read --310/328--
Reference 4,979,275: "30/328" should read --310/328--
Reference 5,479,084: "5,479,084" should read --5,479,064--
Reference 5,479,084: "Satsuma" should read --Sano--
Add Reference to list: --4,088,052 A 5/1978 Hendick.....84/454--
Column 1, line 59: "expansion open" should read --expansion and contraction of the piezoelectric device can be used to operate an apparatus, e.g. to open--
Column 1, line 65: "path The" should read --path. The--
Column 3, line 21: "at east one" should read --at least one--
Column 3, line 32: "in learn motion" should read --in linear motion--
Column 5, line 19: "portion a pair" should read --portion, a pair--
Column 5, line 20: "least pivotable" should read --least one pivotable--
Column 5, line 56: "in am mechanically" should read --in an mechanically--
Column 6, line 28: "folded-back am portions" should read --folded-back arm portions--
Column 7, line 16: "an medically resonant" should read --an mechanically resonant--
Column 8, lines 11-15: Cancel beginning with ", portion and the force transfer" to and including "the actuator"

This certificate supersedes the Certificate of Correction issued January 15, 2008.

Signed and Sealed this

Fifth Day of February, 2008

JON W. DUDAS
*Director of the United States Patent and Trademark Office*